(12) United States Patent
Tesanovic

(10) Patent No.: US 11,502,788 B2
(45) Date of Patent: Nov. 15, 2022

(54) OPERATION OF AUTOMATIC REPEAT REQUEST

(71) Applicant: Samsung Electronics Co., Ltd., Suwon-si (KR)

(72) Inventor: Milos Tesanovic, Staines (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/250,593

(22) PCT Filed: Aug. 8, 2019

(86) PCT No.: PCT/KR2019/009982
§ 371 (c)(1),
(2) Date: Feb. 5, 2021

(87) PCT Pub. No.: WO2020/032626
PCT Pub. Date: Feb. 13, 2020

(65) Prior Publication Data
US 2021/0297198 A1 Sep. 23, 2021

(30) Foreign Application Priority Data
Aug. 9, 2018 (GB) ........................... 1812981

(51) Int. Cl.
*H04L 1/18* (2006.01)
*H04L 1/00* (2006.01)
*H04W 88/14* (2009.01)

(52) U.S. Cl.
CPC .......... *H04L 1/1896* (2013.01); *H04L 1/0025* (2013.01); *H04W 88/14* (2013.01)

(58) Field of Classification Search
CPC . H04B 7/15528; H04L 1/0025; H04L 1/1607; H04L 1/1621; H04L 1/1832; H04L 1/1848; H04L 1/1864; H04L 1/187; H04L 1/1896; H04W 88/04
See application file for complete search history.

(56) References Cited

U.S. PATENT DOCUMENTS

| | | | |
|---|---|---|---|
| 10,764,891 | B2 | 9/2020 | Boyer et al. |
| 2001/0007137 | A1 | 7/2001 | Suumaki et al. |
| 2003/0016698 | A1 | 1/2003 | Chang et al. |
| 2003/0053440 | A1 | 3/2003 | Gruhn et al. |
| 2005/0135284 | A1 | 6/2005 | Nanda et al. |

(Continued)

FOREIGN PATENT DOCUMENTS

| | | |
|---|---|---|
| CN | 111490859 A | 8/2020 |
| EP | 2214435 A1 | 8/2010 |
| WO | 2019216670 A1 | 11/2019 |

OTHER PUBLICATIONS

Supplementary European Search Report in connection with European Patent Application No. 19842260.2; dated Aug. 2, 2021, 10 pages.

(Continued)

*Primary Examiner* — Pao Sinkantarakorn

(57) ABSTRACT

There is disclosed a node for a wireless communication system. The node may comprise a receiver for receiving a data packet, a status report and an acknowledgement (ACK), a transmitter for transmitting the packet, the status reports and the ACK and a processor for selectively operating in a first mode and a second mode, for determining a mode switching criterion.

14 Claims, 3 Drawing Sheets

(56) References Cited

U.S. PATENT DOCUMENTS

| | | |
|---|---|---|
| 2007/0079207 A1 | 4/2007 | Seidel et al. |
| 2008/0148136 A1 | 6/2008 | Bae et al. |
| 2010/0322197 A1 | 12/2010 | Adjakple et al. |
| 2014/0098797 A1 | 4/2014 | Kanamarlapudi et al. |
| 2015/0215987 A1 | 7/2015 | Kim et al. |
| 2016/0212661 A1 | 7/2016 | Basu Mallick et al. |
| 2016/0262066 A1 | 9/2016 | Ozturk et al. |
| 2017/0006499 A1 | 1/2017 | Hampel et al. |
| 2017/0012751 A1 | 1/2017 | Leroux et al. |
| 2017/0099128 A1 | 4/2017 | Gao et al. |
| 2018/0049214 A1 | 2/2018 | Kubota et al. |
| 2018/0063014 A1 | 3/2018 | Yu et al. |
| 2018/0092139 A1 | 3/2018 | Novlan et al. |
| 2018/0139787 A1 | 5/2018 | Islam et al. |
| 2018/0152353 A1 | 5/2018 | Bergstrom et al. |
| 2018/0270791 A1 | 9/2018 | Park et al. |
| 2018/0352524 A1 | 12/2018 | Abedini et al. |
| 2019/0182140 A1 | 6/2019 | Tenny et al. |
| 2019/0223002 A1 | 7/2019 | Novlan et al. |
| 2019/0230736 A1* | 7/2019 | Quan .................... H04W 80/08 |
| 2019/0349036 A1 | 11/2019 | Wang et al. |
| 2019/0372887 A1 | 12/2019 | Majmundar et al. |
| 2020/0413457 A1 | 12/2020 | Hong |
| 2021/0092667 A1* | 3/2021 | Zhu ........................ H04W 24/02 |
| 2021/0159968 A1* | 5/2021 | Fujishiro ................ H04B 7/155 |
| 2021/0235519 A1* | 7/2021 | Yi .......................... H04W 76/12 |
| 2021/0258109 A1* | 8/2021 | Cho ....................... H04W 88/14 |

OTHER PUBLICATIONS

3GPP TR 38.874 V0.3.2 (Jun. 2018), 3rd Generation Partnership Project; Technical Specification Group Radio Access Network; Study on Integrated Access and Backhaul (Release 15), Jun. 2018, 81 pages.

Samsung: "Initial access procedure in IAB" 3GPP TSG-RAN WG3 NR AdHoc 1807, R3-183864, Montreal, Canada, Jul. 2-6, 2018, 3 pages.

Supplementary European Search Report in connection with European Patent Application No. 19846521.3, dated Aug. 11, 2021, 10 pages.

AT&T: "End-to-end vs. hop-by-hop RLC ARQ design for L2 relaying in IAB", 3GPP TSG-RAN WG2 #102, R2-1808758, Busan, Korea, May 21-25, 2018, 8 pages.

Cong et al: "Retransmission Schemes for 5G Radio Interface"; IEEE 2016, 6 pages.

Corrected European Search Report in connection with European Patent Application No. 19846521.3; dated Sep. 17, 2021, 4 pages.

Final Office Action in connection with U.S. Appl. No. 16/524,694, dated Apr. 29, 2021, 20 pages.

Notice of Allowance in connection with U.S. Appl. No. 16/524,694, dated Aug. 18, 2021, 11 pages.

International Search Report and Written Opinion of the International Searching Authority in connection with International Application No. PCT/KR2019/009982 dated Nov. 19, 2019, 9 pages.

Search Report dated Feb. 4, 2019 in connection with United Kingdom Application No. GB1812981.7, 1 page.

AT&T, "End-to-end vs hop-by-hop RLC ARQ design for L2 relaying in IAB," R2-1808041, 3GPP TSG-RAN WG2 #102, Busan, Korea, May 21-25, 2018, 8 pages.

CATT, "ARQ for IAB," R2-1809820, 3GPP TSG RAN WG2#NR ADHOC2, Montreal, Canada, Jul. 2-6, 2018, 3 pages.

Huawei et al., "Further comparison between hop-by-hop ARQ and E2E ARQ," R2-1810678, 3GPP TSG-RAN WG2 Ad Hoc, Montreal, Canada, Jul. 2-6, 2018, 4 pages.

OPPO, "Discussion on User Plane for IAB," R2-1809461, Revision of R2-1806693, 3GPP TSG-RAN WG2 AH-1807, Montreal, Canada, Jul. 2-6, 2018, 5 pages.

Samsung, "IAB failure recovery as part of route management," R3-183865, 3GPP TSG RAN WG3 AH 1807, Montreal, Canada, Jul. 2-6, 2018, 4 pages.

ZTE, "Consideration on RLC ARQ in IAB," R2-1807396, 3GPP TSG-RAN WG2 Meeting #102, Busan, Korea, May 21-25, 2018, 6 pages.

* cited by examiner

OPERATION OF AUTOMATIC REPEAT REQUEST

CROSS-REFERENCE TO RELATED APPLICATIONS

This application is a 371 National Stage of International Application No. PCT/KR2019/009982, filed Aug. 8, 2019, which claims priority to United Kingdom Patent Application No. GB 1812981.7, filed Aug. 9, 2018, the disclosures of which are herein incorporated by reference in their entirety.

BACKGROUND

1. Field

The present invention relates to the technical field of wireless communication, and in particular to a apparatus and/or systems for operating an Automatic Repeat Request (ARQ) scheme. For example, certain examples of the present disclosure provide methods, apparatus and/or systems for operating an end-to-end ARQ scheme. For example, certain examples of the present disclosure provide methods, apparatus and/or systems for operating an ARQ scheme within $3^{rd}$ Generation Partnership Project (3GPP) 5th Generation (5G) New Radio (NR) and NR-based relay networks.

2. Description of Related Art

To meet the demand for wireless data traffic having increased since deployment of 4th generation (4G) communication systems, efforts have been made to develop an improved 5th generation (5G) or pre-5G communication system. The 5G or pre-5G communication system is also called a 'beyond 4G network' or a 'post long term evolution (LTE) system'. The 5G communication system is considered to be implemented in higher frequency (mmWave) bands, e.g., 60 GHz bands, so as to accomplish higher data rates. To decrease propagation loss of the radio waves and increase the transmission distance, beamforming, massive multiple-input multiple-output (MIMO), full dimensional MIMO (FD-MIMO), array antenna, analog beamforming, and large scale antenna techniques are discussed with respect to 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and Feher's quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

As described above, various services can be provided according to the development of a wireless communication system, and thus a method for easily providing such services is required

SUMMARY

Currently there is an ongoing debate in the Integrated Access and Backhaul (IAB) Study Item within 3 GPP on the pros and cons of a variety of ARQ schemes. Therefore, what is desired is a technique for operating an ARQ scheme in which transmission delays and stalling of the transmission window are reduced or minimized.

It is an aim of certain examples of the present disclosure to address, solve and/or mitigate, at least partly, at least one of the problems and/or disadvantages associated with the related art, for example at least one of the problems and/or disadvantages described above. It is an aim of certain examples of the present disclosure to provide at least one advantage over the related art, for example at least one of the advantages described below.

The present invention is defined in the independent claims. Advantageous features are defined in the dependent claims.

Certain examples of the present disclosure provide a node for operation in a network comprising a UE, an IAB donor, and one or more nodes between the UE and the IAB donor, the node comprising: a receiver for receiving a data packet, a status report and an ACK; a transmitter for transmitting the packet, the status reports and the ACK; and a processor for selectively operating in a first mode and a second mode, for determining a mode switching criterion, and for selectively switching modes based on whether the criterion is satisfied, wherein, in the first mode, the processor is configured for: forwarding a received packet to an adjacent/next node, and forwarding a status report to a next node towards the IAB donor, and wherein, in the second mode, the processor is configured for: forwarding a received packet to an adjacent/next node towards the UE, storing the received packet, inspecting a received status report to determine whether the packet has been correctly received by the UE, retransmitting the stored packet towards the UE if the status report indicates that the packet has not been correctly received by the UE, receiving an ACK corresponding to the retransmitted packet, updating the status report in response to receipt of the ACK, forwarding the updated status report to a next node towards the IAB donor, and discarding the stored packet once the ACK has been received.

Certain examples of the present disclosure provide a method for a node in a network comprising a UE, an IAB donor, and one or more nodes between the UE and the IAB donor, the method comprising: selectively operating in a first mode or a second mode; determining a mode switching criterion; and selectively switching modes based on whether the criterion is satisfied, wherein, when operating in the first mode, the method comprises: forwarding a received packet to an adjacent/next node; and forwarding a status report to a next node towards the IAB donor, and wherein, when operating in the second mode, the method comprises: forwarding a received packet to an adjacent/next node towards the UE; storing the received packet; inspecting a received status report to determine whether the packet has been correctly received by the UE; retransmitting the stored packet towards the UE if the status report indicates that the packet has not been correctly received by the UE; receiving an ACK corresponding to the retransmitted packet; updating the status report in response to receipt of the ACK; forwarding the updated status report to a next node towards the IAB donor; and discarding the stored packet once the ACK has been received.

Certain embodiments of the present disclosure provide a computer program comprising instructions or code which, when executed, implement a method, system and/or apparatus in accordance with any aspect, claim, example and/or embodiment disclosed herein. Certain embodiments of the present disclosure provide a machine-readable storage storing such a program.

Other aspects, advantages, and salient features of the invention will become apparent to those skilled in the art from the following detailed description, which, taken in conjunction with the annexed drawings, disclose examples of the present disclosure.

By the method of the present application, a technique for operating an ARQ scheme in which transmission delays and stalling of the transmission window are reduced or minimized is provided.

BRIEF DESCRIPTION OF THE DRAWINGS

The above and other aspects, and features and advantages of certain examples of the present disclosure will be more apparent from the following detailed description when taken in conjunction with the accompanying drawings, in which.

DETAILED DESCRIPTION

Figure 1:
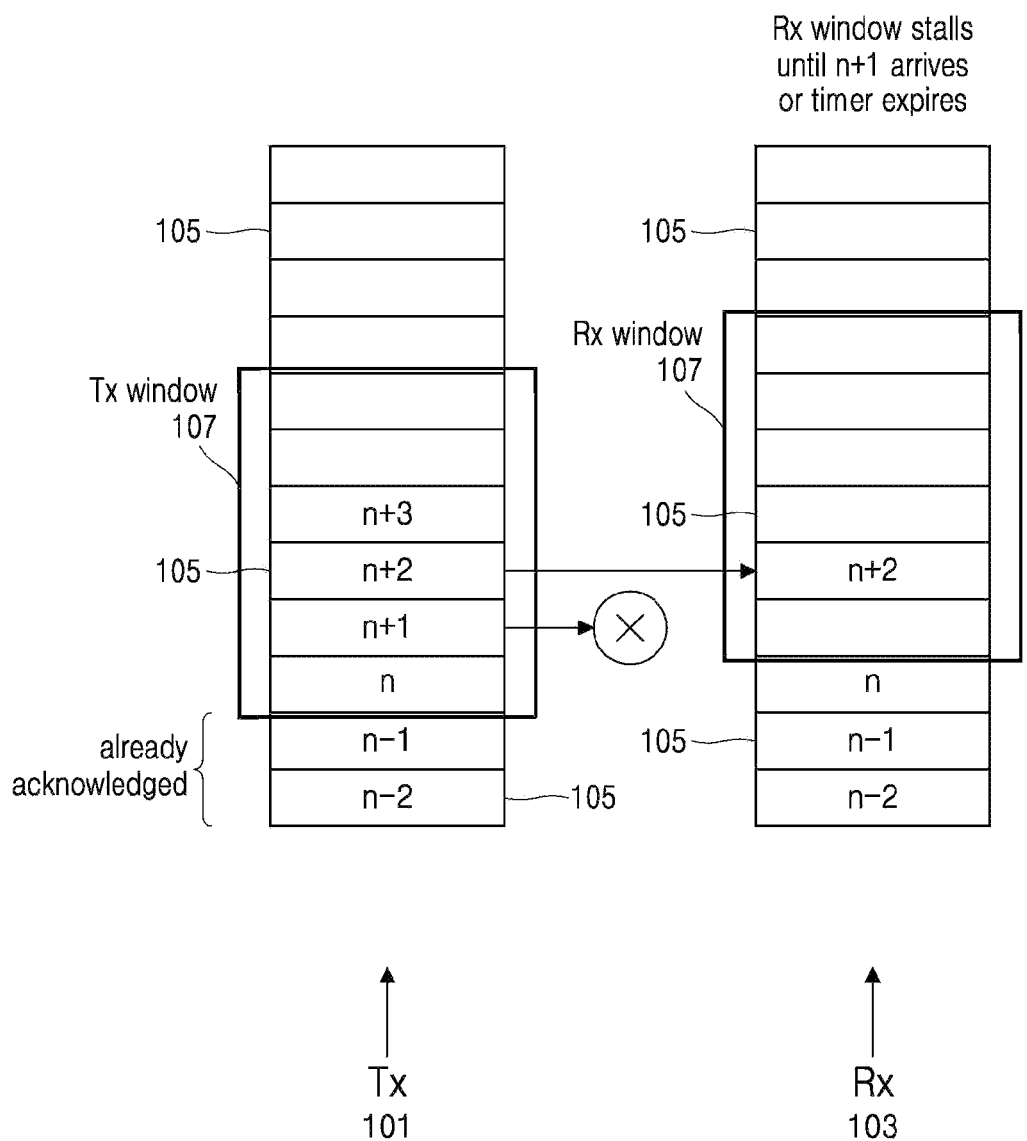
FIG. 1 illustrates an example of an ARQ scheme that may be used in examples of the present disclosure.

Certain examples of the present disclosure provide a node for operation in a network comprising a UE, an IAB donor, and one or more nodes between the UE and the IAB donor, the node comprising: a receiver for receiving a data packet, a status report and an ACK; a transmitter for transmitting the packet, the status reports and the ACK; and a processor for selectively operating in a first mode and a second mode, for determining a mode switching criterion, and for selectively switching modes based on whether the criterion is satisfied, wherein, in the first mode, the processor is configured for: forwarding a received packet to an adjacent/next node, and forwarding a status report to a next node towards the IAB donor, and wherein, in the second mode, the processor is configured for: forwarding a received packet to an adjacent/next node towards the UE, storing the received packet, inspecting a received status report to determine whether the packet has been correctly received by the UE, retransmitting the stored packet towards the UE if the status report indicates that the packet has not been correctly received by the UE, receiving an ACK corresponding to the retransmitted packet, updating the status report in response to receipt of the ACK, forwarding the updated status report to a next node towards the IAB donor, and discarding the stored packet once the ACK has been received.

The following description of examples of the present disclosure, with reference to the accompanying drawings, is provided to assist in a comprehensive understanding of the present invention, as defined by the claims. The description includes various specific details to assist in that understanding but these are to be regarded as merely exemplary. Accordingly, those of ordinary skill in the art will recognize that various changes and modifications of the examples described herein can be made.

The same or similar components may be designated by the same or similar reference numerals, although they may be illustrated in different drawings.

Detailed descriptions of techniques, structures, constructions, functions or processes known in the art may be omitted for clarity and conciseness, and to avoid obscuring the subject matter of the present disclosure.

The terms and words used herein are not limited to the bibliographical or standard meanings, but, are merely used to enable a clear and consistent understanding of the examples disclosed herein.

Throughout the description and claims, the words "comprise", "contain" and "include", and variations thereof, for example "comprising", "containing" and "including", means "including but not limited to", and is not intended to (and does not) exclude other features, elements, components, integers, steps, processes, functions, characteristics, and the like.

Throughout the description and claims, the singular form, for example "a", "an" and "the", encompasses the plural unless the context otherwise requires. For example, reference to "an object" includes reference to one or more of such objects.

Throughout the description and claims, language in the general form of "X for Y" (where Y is some action, process, function, activity or step and X is some means for carrying out that action, process, function, activity or step) encompasses means X adapted, configured or arranged specifically, but not necessarily exclusively, to do Y.

Features, elements, components, integers, steps, processes, functions, characteristics, and the like, described in conjunction with a particular aspect, embodiment, example or claim are to be understood to be applicable to any other aspect, embodiment, example or claim disclosed herein unless incompatible therewith.

Examples of the present disclosure may be implemented in the form of any suitable method, system and/or apparatus for use in digital communication, for example in the form of a mobile/portable terminal (e.g. mobile telephone), handheld device, personal computer, digital television and/or digital radio broadcast transmitter and/or receiver apparatus, set-top-box, etc. Any such system and/or apparatus may be compatible with any suitable existing or future digital wireless system and/or standard, for example 3rd Generation Partnership Project (3GPP) 5th Generation (5G) New Radio (NR).

It will be appreciated that examples of the present disclosure may be realized in the form of hardware, software or a combination of hardware and software. Any such software may be stored in the form of volatile or non-volatile storage, for example a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like.

It will be appreciated that the storage devices and storage media are examples of machine-readable storage that are suitable for storing a program or programs comprising instructions that, when executed, implement certain examples of the present disclosure. Accordingly, certain examples provide a program comprising code for implementing a method, apparatus and/or system disclosed herein, and a machine-readable storage storing such a program. Still further, such programs may be conveyed electronically via any medium, for example a communication signal carried over a wired or wireless connection, and examples of the present disclosure suitably encompass the same.

Currently there is an ongoing debate in the Integrated Access and Backhaul (IAB) Study Item within 3GPP on the pros and cons of end-to end versus hop-by-hop ARQ. For Layer-2 (L2) relaying, data is carried over backhaul Radio Link Control (RLC) channels and the protocol stack at intermediate nodes comprises PHY/MAC/RLC layers only, with the PDCP entities only present at the terminal (UE) and the scheduler (IAB Donor).

Hop-by-hop ARQ cannot guarantee lossless transmission. It also has bigger processing and memory impact on intermediate IAB-nodes. Also, with an increasing number of hops, the resulting increasing out-of-order delivery of Packet Data Convergence Protocol (PDCP) Protocol Data Units (PDUs) may increase the probability of exceeding the maximum PDCP window size.

Therefore, end-to-end ARQ may be used as an alternative scheme to hop-by-hop ARQ. In an end-to-end ARQ scheme, a status report is sent from the receiver to the sender, and any RLC PDUs indicated in the status report are retransmitted. At each IAB node, an RLC PDU is discarded whenever it is forwarded to the next node.

However, transmission delays may occur in some end-to-end ARQ schemes due to the transmitter performing retransmission of all lost PDUs on individual hops. Also, transmission delays may occur in some end-to-end ARQ schemes due to a delay in the delivery of the status report to the transmitter. Such delays may cause stalling of the transmission window as new PDUs cannot be sent from the transmitter to the receiver until the status report is received by the transmitter.

Therefore, what is desired is a technique for operating an end-to-end ARQ scheme in which transmission delays and stalling of the transmission window are reduced or minimized.

The above information is presented as background information only to assist with an understanding of the present disclosure. No determination has been made, and no assertion is made, as to whether any of the above might be applicable as prior art with regard to the present invention.

FIG. 1 illustrates an example of an ARQ scheme that may be used in examples of the present disclosure.

As illustrated in FIG. 1, data packets 105 are transmitted from a transmitter side, Tx, 101 to a receiver side, Rx 103. The packets 105 are numbered in order, and packet numbers n−1, n−2, n, n+1, n+2, n+3 are illustrated in FIG. 1. When the Tx side 101 transmits a packet 105 to the Rx side 103, and the Rx side 103 properly receives the packet 105, the Rx side 103 transmits an acknowledgement, ACK, to the Tx side 101. However, sometimes a packet 105 transmitted by the Tx side 101 may not be received by the Rx side 103, or may be received with errors that cannot be corrected. In this case, the Rx side 103 does not transmit an ACK to the Tx side 101. If the Tx side 101 has transmitted a packet 105 but does not receive an ACK from the Rx side 103 within a certain threshold time then the Tx side 101 retransmits the packet 105 to the Rx side 103. Packets 105 may be retransmitted by the Tx side 101 until an ACK is received, up to a certain maximum number of retransmissions or for a certain maximum retransmission time period.

As illustrated in FIG. 1, packet numbers n−2 and n−1 have been transmitted by the Tx side 101 and the Tx side 101 has received an ACK for these packets 105. Also, packet number n has been transmitted by the Tx side 101 and has been properly received by the Rx side 103, but an ACK for this packet 105 has not yet been received by the Tx side 101. On the other hand, packet number n+1 has been transmitted by the Tx side 101 but this packet 105 has not been received by the Rx side 103 due to a communication error. Packet number n+2 has been transmitted by the Tx side 101 and has been received by the Rx side 103. Subsequent packet numbers n+3 onwards have not yet been transmitted.

The transmission of packets 105 and ACKS is managed using a Tx window 107 at the Tx side 101 and a Rx window 109 at the Rx side 103. The size of the Tx window 107 and Rx window 109 may be equal to a certain number of packets 105 (six in the example illustrated in FIG. 1).

The Tx window 107 of size S corresponds to S consecutive packets 105, where the lowest numbered packet 105 in the Tx window 107 corresponds to the lowest numbered packet 105 for which the Tx side 101 has received an ACK. In the example illustrated in FIG. 1, the current Tx window 107 occupies six packets 105 starting from packet n. Accordingly, as the Tx side 101 receives ACKs from the Rx side 103, the Tx window 107 is shifted upwards to occupy higher numbered packets 105. Even if the Tx side 101 has not received an ACK for a transmitted packet 105 within the current Tx window 107, the Tx side 101 continues to transmit higher numbered packets 105 up to the highest numbered packet 105 falling within the current Tx window 107. However, in this case the Tx window 107 is not advanced, but remains at the same position, with the lowest numbered packet 105 in the Tx window 107 corresponding to the lowest numbered packet 105 for which an ACK has not yet been received. It can be seen that if an ACK for a certain packet 105 is not received, for example due to communication errors resulting in delivery failure of the packet 105, subsequent retransmissions and/or corresponding ACKs, then the Tx window 107 will stall. To avoid stalling of the Tx window 107, when the Tx window 107 is advanced a Tx timer is reset, and if the Tx timer expires the Tx window 107 is advanced even if an ACK has not been received for a packet 105 in the current Tx window 107.

Similarly, the Rx window 109 of size S corresponds to S consecutive packets 105, where the lowest numbered packet 105 in the Rx window 109 corresponds to the lowest numbered packet 105 which has been correctly received by the Rx side 103. In the example illustrated in FIG. 1, the current Rx window 109 occupies six packets 105 starting from packet n+1. Accordingly, as the Rx side 103 receives packets 105 from the Tx side 101, the Rx window 109 is shifted upwards to occupy higher numbered packets 105. Even if the Rx side 103 has not received a certain packet 105, the Rx side 103 continues to receive higher numbered packets 105. However, in this case the Rx window 109 is not advanced, but remains at the same position, with the lowest numbered packet 105 in the Rx window 109 corresponding to the lowest numbered packet 105 which has not yet been received. It can be seen that if a certain packet 105 is not received, for example due to communication errors resulting in delivery failure of the packet 105, then the Rx window 109 will stall. To avoid stalling of the Rx window 109, when the Rx window 109 is advanced an Rx timer is reset, and if the Rx timer expires the Rx window 109 is advanced even if a packet 105 in the current Rx window 109 has not been received.

In certain systems, the Rx side 103 may be capable of processing received packets 105 out of order. For example, if the delivery of a certain packet 105 is delayed while higher numbered packets 105 are received, when the delayed packet 105 is eventually received through a retransmission, the Rx side 103 may reorder the packets.

Figure 2:
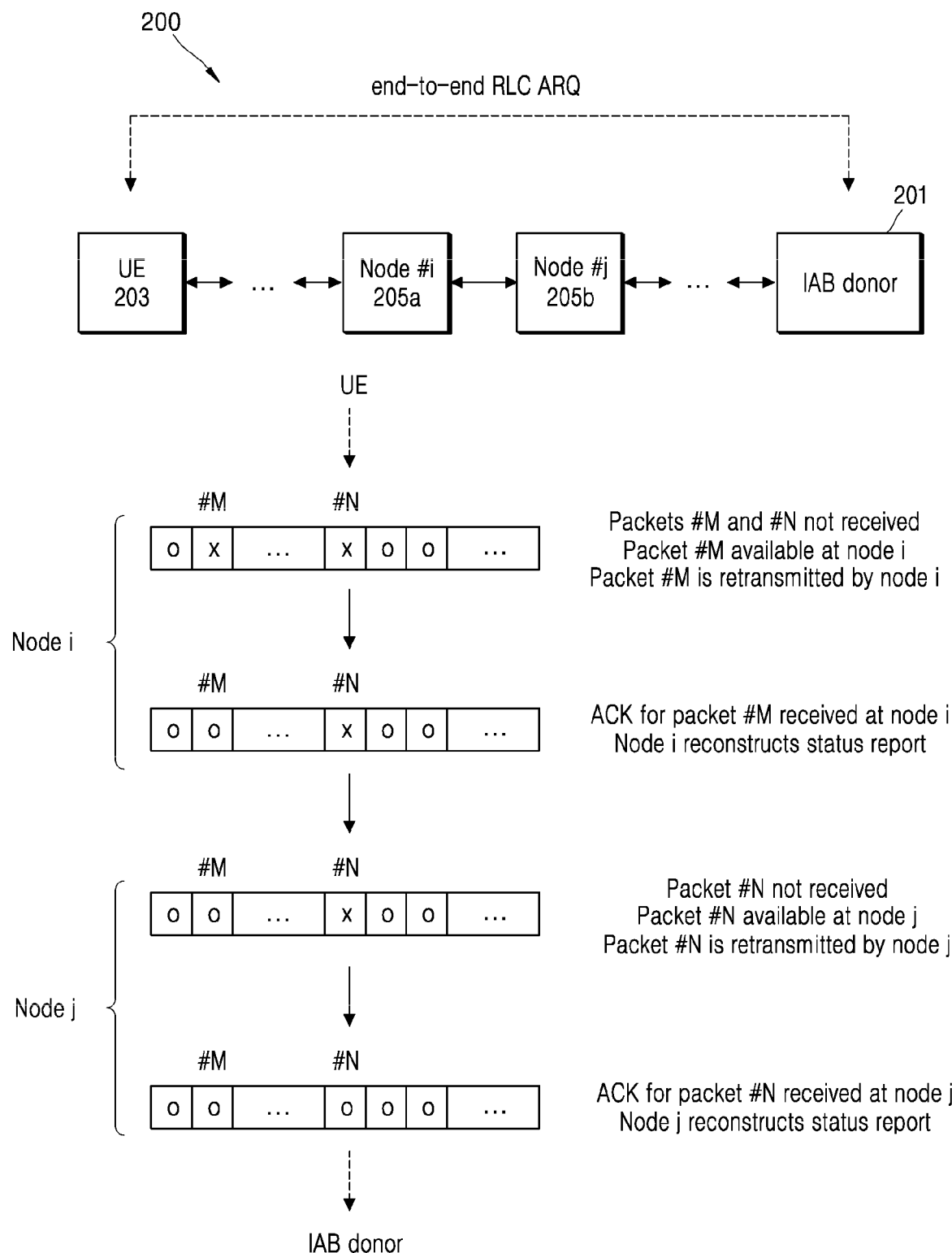
FIG. 2 illustrates an example of an ARQ scheme that may be used in examples of the present disclosure.

FIG. 2 illustrates an example of an ARQ scheme that may be used in examples of the present disclosure. In this example, packets (e.g. PDUs) are transmitted from a Tx side 201 (indicated as IAB donor in the example of FIG. 2) to an Rx side 203 (indicated as User Equipment, UE, in the example of FIG. 2). The packets are transmitted from the IAB donor 201 to the UE 203 via a series of one or more intermediate nodes 205, two of which are illustrated in FIG. 2, labelled IAB node i 205a and IAB node j 205b.

In the scheme illustrated in FIG. 2, the IAB donor 201 transmits a packet to an adjacent node 205, and that node 205 forwards the packet to the next node 205, and so on, until the final node 205 in the chain forwards the packet to the UE 203. In some schemes, the nodes 205 between the IAB donor 201 and the UE 203 may discard packets once they have been forwarded to the next node 205 or to the UE 203. However, in the scheme illustrated in FIG. 2, each node 205 retains a copy of packets after they have been forwarded.

The UE 203 transmits a status reports back to the IAB donor 201 indicating whether or not packets have been successfully received by the UE 203. In particular, a certain status report covers S consecutive packets and includes a field for each packet into which are written values according to whether or not the corresponding packets were successfully received. A status report is transmitted from the UE 203 to an adjacent node 205, and that node 205 forwards the status report to the next node 205, and so on, until the final node 205 in the chain forwards the status report to the IAB donor 201. When the IAB donor 201 receives the status report, the values written in the status report are inspected and the IAB donor 201 retransmits any packets indicated in the status report as having not been correctly received by the UE 203. The IAB donor 201 does not transmit higher numbered packets until the status report indicates that all previously transmitted packets have been correctly received by the UE 203.

It can be seen that transmission delays may occur as a result of the retransmission of packets by the IAB donor 201, for example since in this case the status report and the retransmitted packets each have to traverse the entire chain of nodes 205. Therefore, in the scheme illustrated in FIG. 2, a technique may be implemented to reduce transmission delays. For example, the network 200 may apply a technique as disclosed in Korean patent application number KR 2018-0088159 filed on 27 Jul. 2018. An example of a technique for reducing transmission delays is described in the following.

Specifically, as mentioned above, each node 205 retains a copy of packets after the node 205 has forwarded the packets. Then, when a status report is received by a node 205 (e.g. node i 205a), before forwarding the status report to the next node 205, node i 205a determines which packets have not been correctly received by the UE 203. This may be achieved, for example, either by inspecting the contents of the status report, or alternatively by reading a header of the status report containing sufficient information to enable the determination to be made. If node i 205a has a copy of a packet that the status report indicates has not been correctly received by the UE 203, then node i 205a retransmits that packet to the UE 203, possibly via one or more intermediate nodes 205. Once node i 205a has received an ACK corresponding to the retransmitted packet from the UE 203, then node i 205a reconstructs the status report (for example by reconstructing the header of the status report) but with a modified value for any retransmitted packets for which an ACK has been received indicating successful receipt by the UE 203. The reconstructed status report is then forwarded to the next node 205. A node 205 may discard a packet once an ACK corresponding to that packet has been received by the node 205 from the UE 203. This procedure is performed by each node 205 in the chain until the final status report is delivered to the IAB donor 201.

For example, as illustrated in FIG. 2, node i 205a receives a status report in which packet numbers M and N are indicated as having not been correctly received by the UE 203. Node i 205a has a copy of packet M and so transmits packet M towards the UE 203. On the other hand, node i 205a does not have a copy of packet N and so node i 205a cannot retransmit packet N. Upon receiving an ACK corresponding to retransmitted packet M, node i 205a reconstructs the status report with a modified value for packet M indicating that packet M has been correctly received by the UE 203. Node i 205a then forwards the reconstructed status report to the next node, node j 205b.

Accordingly, node j 205b receives a status report in which packet number N is indicated as having not been correctly received by the UE 203 (while the status report indicates that packet M has been correctly received). Node j 205b has a copy of packet N and so transmits packet N towards the UE 203. Upon receiving an ACK corresponding to retransmitted packet N, node j 205b reconstructs the status report with a modified value for packet N indicating that packet N has been correctly received by the UE 203. Node j 205b then forwards the reconstructed status report to the next node 205.

In this example, it can be seen that the status report received by the IAB donor 201 indicates that all packets have been correctly received by the UE 203. Accordingly, the IAB donor 201 does not need to retransmit any packets. By allowing the nodes 205 to retransmit packets in the manner described above, transmission delays may be reduced since at least some retransmitted packets do not need to traverse the entire chain of nodes 205. In some case, the IAB donor 201 may be required to retransmit some packets. In certain examples, the IAB donor 201 may be required to retransmit some packets if none of the nodes 205 were able to retransmit those packets or if a subset of the nodes were unable to retransmit some of the packets.

A benefit of the technique described above is the potential of reducing the delay compared to when the Tx side 201 performs retransmission of all lost packets on individual hops (i.e. transmission between nodes 205 and between nodes and the UE 203 or IAB donor 201). However, in some situations, the increasing number of retransmissions on individual hops may delay the delivery of the status report to the IAB donor 201, for example since an ACK corresponding to a retransmission needs to be received by the retransmitting node 205 before that node 205 can update the status report and forward the updated status report to the next node 205. This in turn could cause stalling of the Tx window since the IAB donor 201 cannot add any new packets and transmit them towards the UE 203 until the reconstructed status report is received by the IAB donor 201. Additionally, the IAB donor 201 cannot initiate retransmission of failed packets until the reconstructed status report is received by the IAB donor 201. There is therefore an expected cross-over point where reconstruction of the status report will in fact start leading to an increase in delay.

Accordingly, in certain examples of the present disclosure, the system (or network 200), or individual nodes 205, may operate in different modes, and may switch modes according to circumstances. In a first mode, the system 200 or an individual node 205 operates in a manner in which the IAB donor 201 performs all retransmissions of packets and the nodes 205 forward packets and status reports. In some examples, in the first mode, the nodes 205 may not retain packets after they are forwarded. In a second mode, the system 200 or an individual node 205 operates in a manner as described above in relation to FIG. 2 and/or as disclosed in Korean patent application number KR 2018-0088159 filed on 27 Jul. 2018, in which the nodes 205 do retain packets after they are forwarded, perform retransmission of packets and modify and reconstruct status reports if ACKs for retransmitted packets are received.

In certain example, all nodes 205 may operate in the same mode and may switch modes as a group. In other examples, different nodes 205 may be permitted to operate in different modes, and/or may be permitted to independently or separately switch modes. For example, a first node 205 may operate in the second mode, while a second node 205 may operate in the first mode (e.g. due to having insufficient capabilities to operate in the second mode). In another example, first and second nodes 205 may each operate in the second mode, and the first node may switch to the first mode without the second node 205 also switching to the first mode.

In some examples, a certain mode may be selected based on characteristics of the network 200 and the selected mode may be maintained. In other examples, the mode may be switched dynamically according to changing circumstances. The decision to switch between modes may be made based on one or more criteria ("switching criteria"). The switching criteria may depend on one or more factors, for example an estimate of delay incurred, the processing capabilities of the nodes 205, the existing and/or estimated processing load of the nodes 205, and/or the likelihood of the donor 201 transmission window stalling.

In certain examples of the present disclosure, the one or more switching criteria may be defined such that the mode in which the network, or one or more individual nodes, operates is selected so as to reduce or minimize the transmission delay (or average transmission delay) of a specific packet or group of packets. A delay in delivery of the status report to the Tx side (e.g. IAB donor) is one factor that may contribute to a transmission delay. The skilled person will appreciate that various network parameters and/or the network configuration may affect the time taken to deliver the status report Accordingly, in certain examples of the present disclosure, the one or more switching criteria may be defined such that the mode in which the network, or one or more individual nodes, operates is selected so as to reduce or minimize the delay in delivery of the status report to the Tx side (for example, given certain network parameters and/or a certain network configuration).

The estimate of the delay incurred may be obtained, for example, based on one or more of (i) past delay performance history, (ii) knowledge of the link quality and number of links with sub-standard quality (e.g. a quality based on a predetermined quality metric below a certain threshold), which would give an estimate of the likelihood of per-link retransmissions required, and/or (iii) knowledge of the likelihood of link failure and the resulting network topology change. The estimate of the delay incurred may additionally or alternatively be threshold-based. For example, if a certain threshold is exceeded, then the mode may be switched from the first mode to the second mode. The manner in which the estimate of the delay incurred is obtained may be static or reconfigurable, for example based on changes in network topology and/or network load.

The processing capabilities of the nodes may be defined, for example, in terms of whether a node has been added that cannot handle prompt status report updates (where "prompt" may be defined as a maximum allowable processing delay) and/or do not have buffer space to keep packets while waiting for retransmissions. In certain examples, if a node of insufficient capability has been added then the mode may be switched from the second mode to the first mode.

Examples of the existing and/or estimated processing load of the nodes includes, if the scheduling node knows that some or all intermediate nodes cannot store transmitted packets and/or do not have the functionality to reconstruct status reports, and/or if the scheduling node knows that the processing load of certain nodes will increase in the near future due to, for example, addition of new users and/or new traffic and/or new upstream or downstream nodes.

In certain examples, if the likelihood of the donor transmission window stalling is higher than a certain threshold then the mode may be switched from the second mode to the first mode. The likelihood of the donor transmission window stalling may be estimated, for example, based on one or more of (i) past performance, (ii) trade-offs between throughput, window size and/or delay, (iii) technology deployed, and/or (iv) whether out-of-sequence delivery to a higher layer is allowed or not. In relation to trade-offs between throughput, window size and/or delay, in some examples, an increase in delay by a certain amount (e.g. percentage) may be tolerable (and therefore a delay in the switching of modes) so long as the throughput does not fall below a certain minimum. In some examples, the converse may also be true: a loss in throughput may be tolerable but a delay may not be, for example for latency-sensitive applications. In some examples, the type of traffic may be taken into account in deciding whether to switch modes. In another example, the ARQ window size may be shortened or lengthened rather than switch between modes. In some examples, the two modes may be combined (effectively changing the switch-over point).

Figure 3:
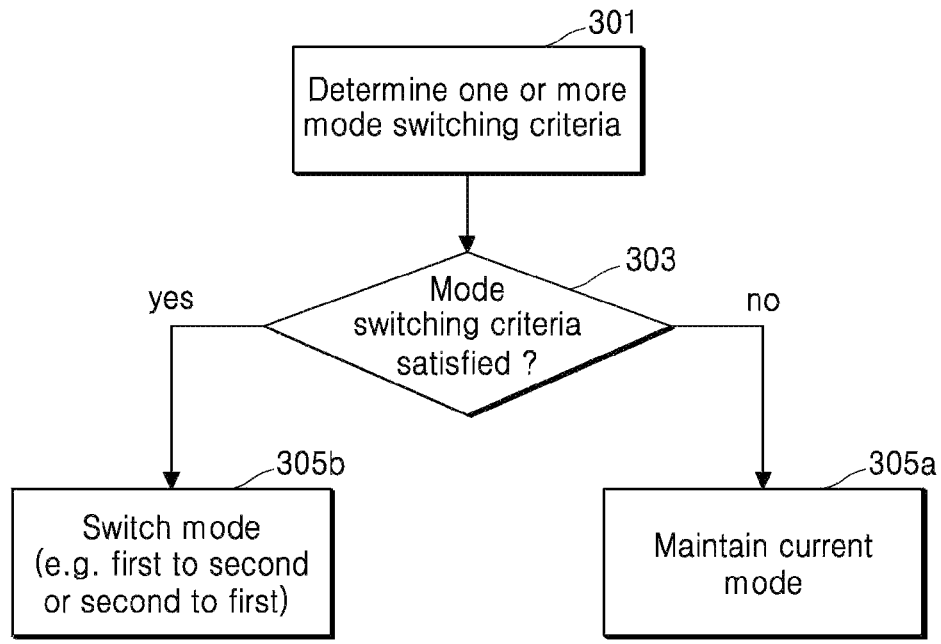
FIG. 3 is a flowchart of an exemplary method for operating an ARQ scheme that may be used in examples of the present disclosure.

FIG. 3 is a flowchart of an exemplary method for operating an ARQ scheme that may be used in examples of the present disclosure. In a first step 301, one or more mode switching criteria are determined. For example, the mode switching criteria may be defined according to one or more of the above examples. In a second step 303, it is determined if the mode switching criteria are satisfied. In a next step 305a, if the mode switching criteria are not satisfied then the current mode is maintained. On the other hand, in a next step 305b, if the mode switching criteria is satisfied then the mode is switched. For example, the mode may be switched from the first mode to the second mode if certain criteria are satisfied, or switched from the second mode to the first mode if certain other criteria are satisfied.

Figure 4:
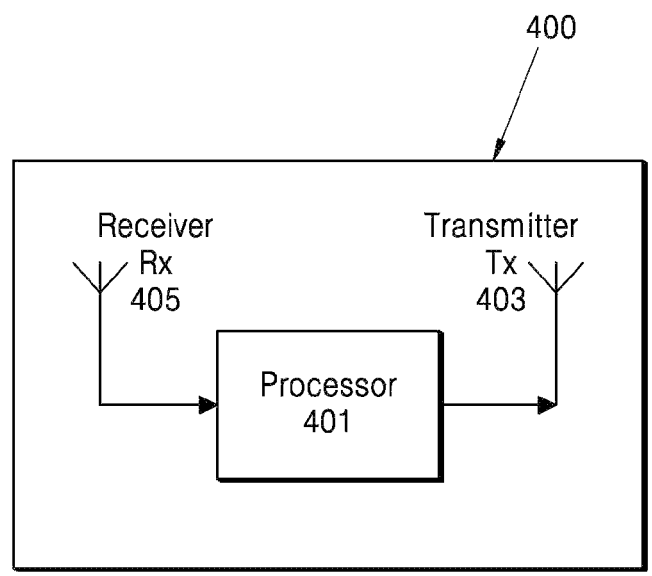
FIG. 4 is a block diagram of an exemplary node for operating an ARQ scheme that may be used in examples of the present disclosure.

FIG. 4 is a block diagram of an exemplary node for operating an ARQ scheme that may be used in examples of the present disclosure. The node 400 comprises a processor (or controller) 401, a transmitter 403 and a receiver 405. However, all of the illustrated components are not essential. The node 400 may be implemented by more or less components than those illustrated in FIG. 4. In addition, the processor 401 and the transmitter 403 and the receiver 405 may be implemented as a single chip according to another embodiment. The receiver 405 is configured for receiving (from other nodes 205, the UE 203 and/or the IAB donor 201) packets, status reports and ACKs. The transmitter 403 is configured for transmitting (to other nodes 205, the UE 203 and/or the IAB donor 201) packets, status reports and ACKs. The processor 401 may include one or more processors or other processing devices that control the proposed function, process, and/or method. The processor 401 is configured for controlling operations as described above in relation to FIGS. 1-3. For example, the processor 401 is configured for operating in the first mode or the second mode, for determining one or more mode switching criteria, and for selectively switching modes (from the first mode to the second mode or from the second mode to the first mode) based on whether the criteria are satisfied.

In the first mode, the processor 401 is configured for forwarding a received packet to an adjacent/next node towards the UE, for forwarding a status report to a next node towards the IAB donor, and for discarding the received packet once the packet has been forwarded to the next node.

In the second mode, the processor 401 is configured for forwarding a received packet to an adjacent/next node towards the UE, for storing the received packet, for inspecting a received status report (or header thereof) to determine whether the packet has been correctly received by the UE 203, for retransmitting the stored packet towards the UE 203 if the status report indicates that the packet has not been correctly received by the UE 203, for receiving an ACK corresponding to the retransmitted packet, for updating/reconstructing the status report in response to receipt of the ACK, for forwarding the updated/reconstructed status report to a next node towards the IAB donor 201, and for discarding the stored packet once the ACK has been received.

While the invention has been shown and described with reference to certain examples, it will be understood by those skilled in the art that various changes in form and detail may be made therein without departing from the scope of the invention, as defined by the appended claims.

Those skilled in the art may understand achieving all or a portion of the steps carried out by the method embodiments described above may be accomplished through commanding the associated hardware by a program, the program may be stored in a computer readable storage medium, when it is executed, one of the steps of the method embodiments or a combination thereof is included.

In addition, the functional units in the various embodiments of the present application may be integrated in a processing module, or each unit may be physically present individually, or two or more units may be integrated in one module. The integrated module may be implemented in the form of hardware, and may also be achieved in the form of software function modules. The integrated module may also be stored in a computer-readable storage medium if it is implemented in the form of a software function module and is sold or used as a standalone product.

The invention claimed is:

1. A method performed by a node relaying a communication between a user equipment (UE) and an integrated access and backhaul (IAB) donor in a wireless communication system, the method comprising:
   performing an automatic repeat request (ARQ) based on a current mode, wherein the current mode is one among a first mode associated with end-to-end ARQ and a second mode associated with hop-by-hop ARQ;
   switching the current mode to the other one among the first mode and the second mode based on one or more criteria for switching between modes; and
   performing the ARQ based on the switched current mode, wherein the switching of the current mode comprises:
      in case that the current mode is the first mode and a transmission delay is greater than a first threshold, switching the current mode to the second mode.

2. The method of claim 1, wherein, in case that the current mode is the second mode, a packet is buffered in the node until an acknowledgement (ACK) corresponding to the packet is received from the UE.

3. The method of claim 2, wherein the performing of the ARQ based on the current mode comprises:
   receiving a status report including a field associated with retransmission of the packet.

4. The method of claim 3, wherein the performing of the ARQ based on the current mode further comprises:
   updating the field included in the status report based on the ACK.

5. The method of claim 1, wherein the one or more criteria comprise:
   information associated with a link failure.

6. The method of claim 1, wherein the ARQ is associated with downlink transmission.

7. The method of claim 1, wherein the switching of the current mode further comprises:
   in case that the current mode is the second mode and a likelihood that a transmission window of the IAB donor stalls is greater than a second threshold, switching the current mode to the first mode.

8. A node relaying a communication between a user equipment (UE) and an integrated access and backhaul (IAB) donor in a wireless communication system, the node comprising:
   a transceiver; and
   at least one processor configured to:
   perform an automatic repeat request (ARQ) based on a current mode, wherein the current mode is one among a first mode associated with end-to-end ARQ and a second mode associated with hop-by-hop ARQ;
   switch the current mode to the other one among the first mode and the second mode based on one or more criteria for switching between modes; and
   perform the ARQ based on the switched current mode, wherein the at least one processor is further configured to:
      in case that the current mode is the first mode and a transmission delay is greater than a first threshold, switch the current mode to the second mode.

9. The node of claim 8, wherein, in case that the current mode is the second mode, a packet is buffered in the node until an acknowledgement (ACK) corresponding to the packet is received from the UE.

10. The node of claim 9, wherein the at least one processor is further configured to:
receive via the transceiver, a status report including a field associated with retransmission of the packet.

11. The node of claim 10,
wherein the at least one processor is further configured to:
update the field included in the status report based on the ACK.

12. The node of claim 8, wherein the one or more criteria comprise:
information associated with a link failure.

13. The node of claim 8, wherein the ARQ is associated with downlink transmission.

14. The node of claim 8, wherein the at least one processor is further configured to:
in case that the current mode is the second mode and a likelihood that a transmission window of the IAB donor stalls is greater than a second threshold, switch the current mode to the first mode.

\* \* \* \* \*